US011511143B2

(12) United States Patent
Wooley et al.

(10) Patent No.: US 11,511,143 B2
(45) Date of Patent: Nov. 29, 2022

(54) MOBILE FIRE PROTECTION SYSTEM AND METHOD

(71) Applicant: DONAPHASE (PTY) LIMITED, Johannesburg (ZA)

(72) Inventors: Richard Douglas Wooley, Johannesburg (ZA); Michael Grant Van Niekerk, Johannesburg (ZA); Jan Daniël Philippus Pretorius, Johannesburg (ZA); Christoffel Andries Ernst, Johannesburg (ZA); William Symington Herbert Porter, Johannesburg (ZA)

(73) Assignee: DONAPHASE (PTY) LIMITED, Johannesburg (ZA)

( * ) Notice: Subject to any disclaimer, the term of this patent is extended or adjusted under 35 U.S.C. 154(b) by 0 days.

(21) Appl. No.: 16/643,019

(22) PCT Filed: Aug. 28, 2018

(86) PCT No.: PCT/IB2018/056552
§ 371 (c)(1),
(2) Date: Feb. 28, 2020

(87) PCT Pub. No.: WO2019/043574
PCT Pub. Date: Mar. 7, 2019

(65) Prior Publication Data
US 2020/0197733 A1     Jun. 25, 2020

(30) Foreign Application Priority Data
Aug. 30, 2017   (ZA) .................................. 2017/04439

(51) Int. Cl.
*A62C 27/00*        (2006.01)
*G08B 17/12*        (2006.01)
(Continued)

(52) U.S. Cl.
CPC ............ *A62C 27/00* (2013.01); *G01J 5/0014* (2013.01); *G08B 17/12* (2013.01); *G08B 29/183* (2013.01)

(58) Field of Classification Search
CPC ...... A62C 27/00; G08B 29/183; G08B 17/12; G01J 5/0014
See application file for complete search history.

(56) References Cited

U.S. PATENT DOCUMENTS 3,139,143 A * 6/1964 Renda .................... A62C 37/40
169/19
3,187,499 A * 6/1965 Ault ...................... A62C 35/605
60/635
(Continued)

FOREIGN PATENT DOCUMENTS

DE       20019808 U1    4/2001
EP        1973085 A2    9/2008

OTHER PUBLICATIONS

International Search Report and Written Opinion issued in corresponding application No. PCT/IB2018/056552, dated Aug. 30, 2017, 10 pages.

*Primary Examiner* — Marcus H Taningco
(74) *Attorney, Agent, or Firm* — Meunier Carlin & Curfman LLC

(57) ABSTRACT

A mobile fire protection system comprises a first radiation detector for detecting radiation emitted by a flame in a monitoring region. A container holds fire suppression agent, the container being in selective fluid flow communication via a passage with an outlet for discharging the fire suppression agent. A mobile support structure carries the container. A valve is selectively movable between a closed state, wherein the fire suppression agent remains captive within the container, and an open state, wherein flow of the fire suppression agent from the container towards the outlet is (Continued)

enabled. A controller is configured, responsive to the first radiation detector detecting radiation emitted by the flame in the monitoring region, to cause the valve to move to the open state to discharge the fire suppression agent via the passage and the outlet towards the flame.

15 Claims, 11 Drawing Sheets

(51) Int. Cl.
    *G08B 29/18*     (2006.01)
    *G01J 5/00*     (2022.01)

(56) References Cited

U.S. PATENT DOCUMENTS

| | | | |
|---|---|---|---|
| 5,612,676 A | 3/1997 | Plimpton et al. | |
| 8,907,799 B2* | 12/2014 | McKenna | G08B 17/06 |
| | | | 340/584 |
| 10,509,403 B2* | 12/2019 | Chao | G05D 1/0242 |
| 2008/0271903 A1* | 11/2008 | Lindstrom | A62C 35/02 |
| | | | 169/61 |
| 2011/0155397 A1* | 6/2011 | Icove | G08B 29/183 |
| | | | 169/43 |
| 2015/0021054 A1* | 1/2015 | McNamara | A62C 37/40 |
| | | | 169/46 |
| 2015/0204725 A1 | 7/2015 | Huseynov et al. | |
| 2016/0354626 A1* | 12/2016 | McNamara | A62C 37/40 |
| 2019/0294165 A1* | 9/2019 | Hofmann | A62C 3/0292 |

* cited by examiner

MOBILE FIRE PROTECTION SYSTEM AND METHOD

CROSS-REFERENCE TO RELATED APPLICATIONS

This application claims priority from South African provisional patent application number 2017/04439 deemed to be filed on 30 Aug. 2017, which is incorporated by reference herein.

FIELD OF THE INVENTION

This invention relates to fire protection. More specifically, but not exclusively, this invention relates to an active fire suppression system for detecting and suppressing a flame. The invention extends to a method of suppressing a flame.

BACKGROUND TO THE INVENTION

Fire detection and fire extinguishing or fire suppression systems are well-known. Passive fire protection (PFP) is sometimes used, for example when a physical barrier such as a firewall is constructed to inhibit propagation of a fire. However, construction of a physical barrier or other forms of PFP is sometimes not possible or not a practical solution. Active fire protection (AFP) is characterised by systems or devices that actively respond to a fire that is detected or sensed. An example of AFP is a conventional fire sprinkler system that is for example used in buildings to discharge water via one or more sprinklers when a fire, heat, or smoke is detected. The nozzles of water sprinkler systems generally have a heat sensitive glass bulb with a liquid inside, with the glass bulb holding a valve in a closed state. When the liquid inside heats up enough due to a fire, the glass breaks which causes the valve to open and water is sprayed onto the fire via the nozzle. These systems generally have a relatively slow response time because they require the ambient temperature to rise significantly before the bulb breaks. Apart from being slow, fire sprinkler systems generally use water and cannot be used in some applications, for example where a hydrocarbon fire is expected.

Optical flame detectors are sometimes used in an effort to detect flames more quickly. Some optical flame detectors monitor the ultraviolet (UV) and/or the infrared (IR) spectral bands and while optical flame detectors certainly offer a faster response time, they still suffer from a number of disadvantages, including that detection ability may be attenuated by the presence of smoke and UV radiation may be absorbed by oily films (that are often present when hydrocarbon fires occur). As a result, these devices do not always detect flames accurately. Optical flame detectors are also notoriously expensive and in some instances prohibitively so. A further problem associated with many prior art optical flame detection devices is their sensitivity to electric arcs, x-rays and lightning storms, which may cause false alarms.

A yet further problem associated with prior art fire protection systems is that the nozzles that discharge the fire extinguishing agent are not located sufficiently proximate the source of the fire. This may result in the fire taking longer to extinguish and a greater extent of damage after the fact. Particularly in applications where human lives are at stake, the known fire detection and extinguishing systems do not provide adequate fire protection or reliability, their response times are not fast enough or they are too expensive. Many fire extinguishing systems are not mobile and those that are mobile do not provide adequately fast response times or require a user to physically stand next to the fire while manually discharging the extinguishing agent. A further problem is that because many of these devices are cumbersome to use, they are sometimes not used at all which poses a large risk to human life and damage to property.

There is scope to address the aforementioned disadvantages.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

According to an aspect of the invention there is provided a mobile fire protection system comprising:
  a first radiation detector for detecting radiation emitted by a flame in a monitoring region;
  a container for holding fire suppression agent, the container being in selective fluid flow communication via a passage with an outlet for discharging the fire suppression agent;
  a mobile support structure for carrying the container;
  a valve that is selectively movable between a closed state, wherein the fire suppression agent remains captive within the container, and an open state, wherein flow of the fire suppression agent from the container towards the outlet is enabled; and
  a controller which is configured, responsive to the first radiation detector detecting radiation emitted by the flame in the monitoring region, to cause the valve to move to the open state to discharge the fire suppression agent via the passage and the outlet towards the flame.

Further features provide for the first radiation detector to be configured to detect radiation emitted by a flame caused by the ignition of hydrocarbon or another flammable material.

Still further features provide for the first radiation detector to be a first wideband radiation detector having a detection range in a wide wavelength band having a width of at least 2 µm to 3 µm, alternatively a width of at least 3 µm to 5 µm, alternatively a width of at least 2 µm to 5 µm, alternatively a width of at least 1 µm to 7.5 µm; for a first passband filter to be applied to the first wideband radiation detector that limits the width of the detection range of the first wideband radiation detector to a first narrow wavelength band, thereby enabling the first wideband radiation detector to detect radiation emitted by the flame in the first narrow wavelength band; for the first narrow wavelength band to be between 2.5 µm and 3.2 µm so that flame radiation at a wavelength of 2.7 µm or 2.8 µm or 2.9 µm or 3 µm may be detected, alternatively for the first narrow wavelength band to be between 4 µm to 5 µm, so that flame radiation at a wavelength of 4.1 µm or 4.2 µm or 4.3 µm or 4.4 µm or 4.5 µm may be detected; for the first radiation detector to be resistant, or impervious to detecting solar radiation; and for the first radiation detector to be resistant or impervious to detecting radiation emitted by a human or mammal body. It will be appreciated that the abbreviation "µm" refers to microns.

Yet further features provide for the system to include a second wideband radiation detector; and for a second passband filter to be applied to the second wideband radiation detector to enable the second wideband radiation detector to detect radiation emitted by the flame in a second narrow wavelength band that may be different from the first narrow wavelength band detected by the first wideband radiation detector. The second wideband radiation detector may be similar to the first wideband radiation detector. The second passband filter may be different from the first passband filter. The first and second radiation detectors may be carried by the mobile support structure.

Further features provide for the first and second narrow wavelength bands to be between 2.6 µm and 3 µm, alternatively between 3.5 µm and 4.5 µm, alternatively between 4 µm and 4.5 µm; for the first narrow wavelength band to be between 2.6 µm and 3 µm; for the second narrow wavelength band to be between 3.5 µm and 4.5 µm; for the first radiation detector to be arranged to detect radiation emitted by the flame in a wavelength region of 2.8 µm; and for the second radiation detector to be arranged to detect radiation emitted by the flame in the wavelength region of 4.3 µm or vice versa.

Still further features provide for the time between an ignition of the flame and the fire suppression agent discharge initiation by the system to be less than 100 milliseconds (ms), alternatively less than 50 ms, alternatively less than 35 ms, alternatively less than 5 ms.

Yet further features provide for the system to include a comparing component; for the comparing component to be configured to compare a value of the radiation detected by one of the first and second radiation detectors to a threshold value and to cause the valve to move to the open state when the radiation detected by the one of the first and second radiation detectors exceeds the threshold value; alternatively, for the comparing component to be configured to compare a value of the radiation detected by the first radiation detector to a value of radiation detected by the second radiation detector to determine a difference therebetween; and for the controller to be configured to cause the valve to move to the open state when the difference exceeds or is less than a threshold; alternatively for the controller to be configured to cause the valve to move to the open state when radiation of a predefined wavelength is detected by one of the first and second radiation detector.

Further features provide for the controller to be configured to determine whether a frequency of the detected radiation is greater than a predetermined value; for the predetermined value to be 50 Hz, alternatively 30 Hz, alternatively 20 Hz, alternatively 10 Hz; for the controller to be configured to be responsive only to detected radiation having a frequency or flicker frequency of less than the predetermined value, for example less than 20 Hz; and for a low-pass filter to be provided to enable the controller not to be responsive to detected radiation having a frequency of more than the predetermined value.

Still further features provide for the first and/or second radiation detectors each to be in the form of one or more thermocouples; and for the first and/or second radiation detectors each to be in the form of a thermopile which may comprise an arrangement of thermocouples configured to detect radiation emitted by the flame; for a transparent or translucent optic to be provided for each of the first and second radiation detectors; for the optic to comprise a body; for the body to have a layer or a coating or a cladding provided thereon; and for the body of the optic to be made of quartz; for the first and/or second passband filter to comprise the layer, coating or cladding applied to the body of the optic of the first and/or second radiation detector, the layer being configured to filter the detected radiation to enable a narrower wavelength band including radiation emitted by the flame to pass the filter layer and to be detected by the first and/or second radiation detector. It should be appreciated that any one of the features mentioned in this paragraph may be used in isolation, independent of the other features.

Yet further features provide for the valve to be in the form of an automatic control valve, such as a solenoid valve, a hydraulically or a pneumatically operated valve.

Further features provide for the radiation detector to have a cone of vision with a cone angle $\alpha_{max}$ of at least 45°, alternatively at least 67°, alternatively at least 120°.

A still further feature provides for the passage to be in the form of a pipe or a series of pipes arranged between the container and the outlet.

A yet further feature provides for the mobile support structure to be in the form of a trolley having one or more wheels.

Further features provide for the outlet to be in the form of one or more nozzles; for the nozzles to be provided in an array connected to the passage; for the outlet to be provided at a remote location from the mobile support structure; for the passage to be in the form of a flexible pipe connectable to the container and to the nozzles and/or to the array; and for one or more coupling devices to be provided to couple the pipe to the container and to the nozzles. The coupling devices may be of a quick-release type. The array of nozzles may be releasably attachable to the pipe and/or to the container.

Still further features provide for the system to be provided at a fuel station or at a filling station; for fuel-related equipment to be monitored by the system or for equipment having a fire-hazard to be monitored by the system; and for the monitoring region to be a region at the fuel station where hydrocarbon fuel or other flammable fuel is located, or where the fuel-related equipment is located and/or where vapour or gas relating to the fuel is expected to be present; and for the one or more nozzles to be directed at the monitoring region; and for a distance between the nozzles and the monitoring region to be less than 50 m, alternatively less than 10 m, alternatively less than 5 m, alternatively less than 2 m, alternatively less than 1 m; and for a distance between the first and/or second radiation detector and the monitoring region to be less than 50 m, alternatively less than 10 m, alternatively less than 5 m, alternatively less than 2 m, alternatively less than 1 m. It should be appreciated that any of the features mentioned in this paragraph may be used in isolation, independent of the other features. Yet further features provide for the mobile support structure to be provided in proximity to a manhole opening which may be at the fuel station; for a pit to be provided below the manhole; for the equipment to be provided in the pit; for the outlet or nozzles to be provided in the pit; for the outlet or nozzles to be mounted to a separate frame or support; for the separate frame to be operatively mounted inside the pit; and for the first and/or second radiation detector to also be provided in the pit and mounted to or carried by the separate support or frame.

Further features provide for a housing to be provided for the controller; for the housing to be mounted to the mobile support structure, to the trolley or to the separate frame or the housing may be provided remotely; for a battery to be provided for supplying power to the controller and/or to other components of the system; for the battery to be rechargeable; and for the battery to be provided inside the housing.

Still further features provide for the container to be in the form of a tank; and for the fire suppression agent to be selected from the group of agents comprising: helium, neon, argon, nitrogen, CO₂, inergen™ (being a proprietary blend of Ar (50%), N (42%) and CO₂ (8%)), Telesolv™ 1% (proprietary foam concentrate), FM200™ or $CF_3CHFCF_3$ (heptafluoropropane), HFC 227™ or 1,1,1,2,3,3,3-Heptafluoropropane, HFC 125™ or 1,1,1,2,2-pentafluoroethane, or a combination of these.

It should be appreciated that any of the features of the invention mentioned in the preceding paragraphs may be used in isolation, independent of the other features.

According to another aspect of the invention there is provided a method of providing mobile protection against a fire, the method comprising:

providing a first radiation detector for detecting radiation emitted by a flame in a monitoring region;

providing a container for holding fire suppression agent and enabling the container to be in selective fluid flow communication via a passage with an outlet for discharging the fire suppression agent;

providing a mobile support structure for carrying the container;

between the container and the outlet, interposing a valve that is selectively movable between a closed state, wherein the fire suppression agent remains captive within the container, and an open state, wherein flow of the fire suppression agent from the container towards the outlet is enabled; and configuring a controller: to be responsive to the first radiation detector detecting radiation emitted by the flame in the monitoring region, and to cause the valve to move to the open state to discharge the fire suppression agent via the passage and the outlet towards the flame.

An embodiment of the invention will now be described, by way of example only, with reference to the accompanying drawings.

DETAILED DESCRIPTION WITH REFERENCE TO THE DRAWINGS

Embodiments described herein provide a mobile fire protection system and method. In one embodiment, the system is provided in proximity to equipment with a fire risk or fire hazard and the components of the system are provided on a mobile trolley. In another embodiment, some of the components of the system are provided remotely from a tank for holding fire extinguishing agent or fire suppression agent. Some of the components may for example be provided inside a hole, with the fire-risk related equipment located inside the hole. One or more sensors, optical detectors or radiation detectors are provided for detecting radiation or radiative energy emitted by a flame or as result of a reaction caused by ignition of combustible material. The flame is expected to occur in a monitoring region that is, in use, monitored by the system. The system is configured to discharge the fire suppression agent from the tank via a series of pipes and one or more nozzles towards the flame when the flame is detected. Throughout the figures, like features are referenced with like numerals.

Figure 1:
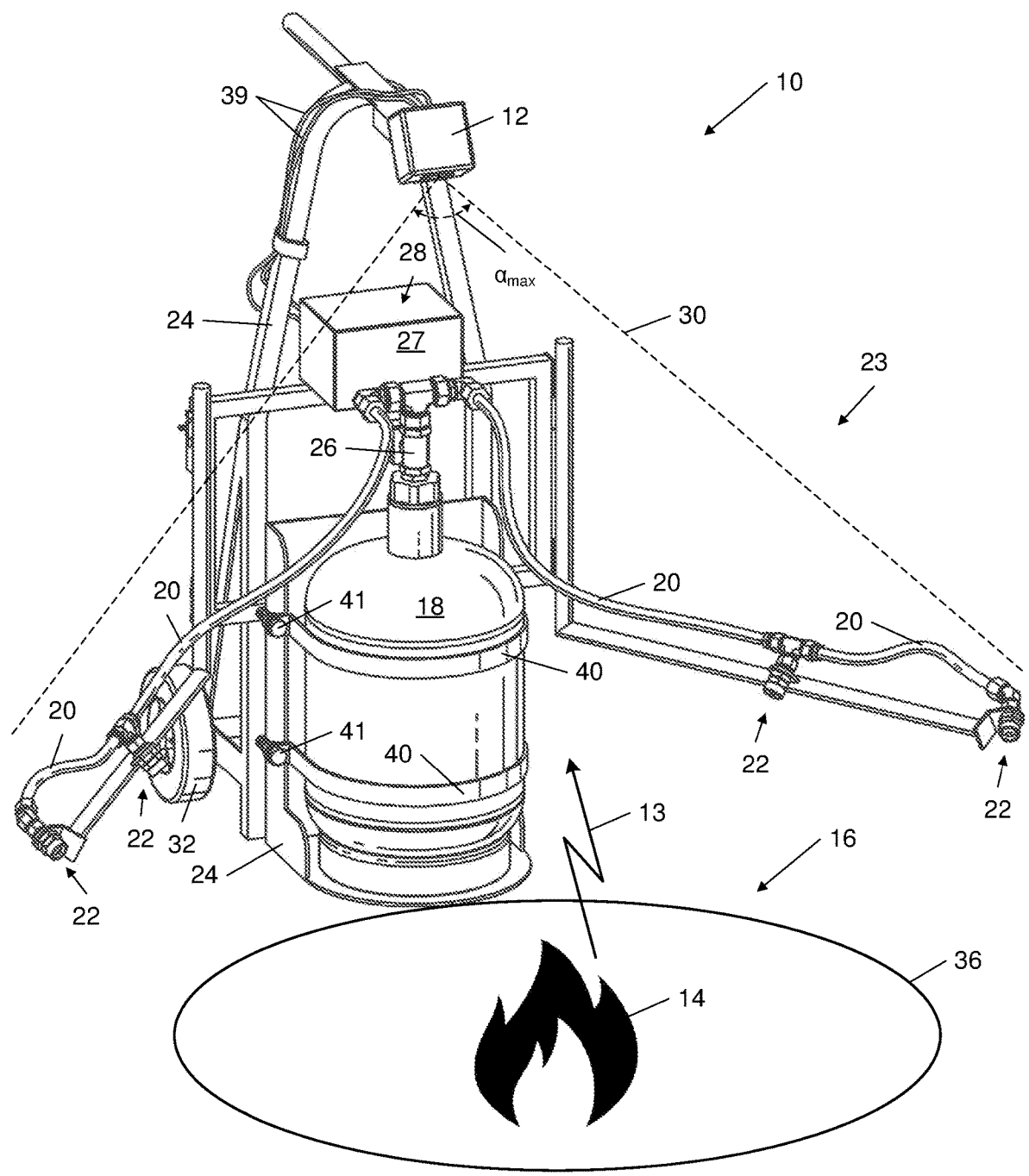
FIG. 1 is a three dimensional view of one embodiment of a mobile fire protection system configured to detect a flame with at least one radiation detector.

FIG. 1 shows a mobile fire protection system (10) comprising a first radiation detector (12) for detecting radiation (13) emitted by a flame (14) in a monitoring region (16). A container (18) is provided for holding fire suppression agent therein (the agent may be held under pressure). The container (18) is in selective fluid flow communication via a passage (20) with an outlet (22) for discharging the fire suppression agent. A mobile support structure (24) is provided for carrying the container (18). A valve (26) is selectively movable between a closed state, wherein the fire suppression agent remains captive within the container (18), and an open state, wherein flow of the fire suppression agent from the container (18) towards the outlet (22) is enabled. The system (10) further includes a controller (28) which is configured, responsive to the first radiation detector (12) detecting radiation emitted by the flame (14) in the monitoring region (16), to cause the valve to move to the open state to allow the fire suppression agent to be discharged via the passage (20) and the outlet (22) towards the flame (14). The controller (28) may be provided in a housing (27) mounted to the mobile support structure (24) or the housing (27) and controller (28) may be provided remotely. A battery (not shown) is for example provided in the housing (27) for supplying power to the controller (28) and/or to other components of the system (10). The radiation (13) is for example caused by the emission of photons as result of the combustion of a fuel. For a hydrocarbon flame, CO₂ and H₂ is typically produced and photons are emitted particularly at the 2.8 μm (or microns) and 4.3 μm wavelengths.

In the example embodiment, the monitoring region (16) is a region where hydrocarbon-related equipment is located, however it will be appreciated that the invention extends to other types of equipment or regions where there is a risk or hazard of fire. The first radiation detector (12) has a cone of vision (30) with a maximum viewing angle or cone angle $\alpha_{max}$ in which a flame may be detected with an acceptable amount of reliability. The maximum viewing angle is in the embodiment at least 45°, however $\alpha_{max}$ may be at least 67° or at least 120°. The first radiation detector (12) is configured to detect radiation emitted by the flame (14) caused by the ignition of hydrocarbon or another flammable fluid or material in the monitoring region (16). The valve (26) is in the form of an automatic control valve connected to the controller, such as a solenoid valve, however a hydraulically or a pneumatically operated valve may also be used. The passage (20) is in the form of a pipe or a series of pipes arranged between the container (18) and the outlet (22). In this embodiment, the mobile support structure (24) is a trolley having one or more wheels (32) that facilitates moving the system (10) to the equipment or region where fire protection is required. The outlet comprises one or more nozzles (22), in this embodiment arranged in a nozzle array (23).

Figure 5:
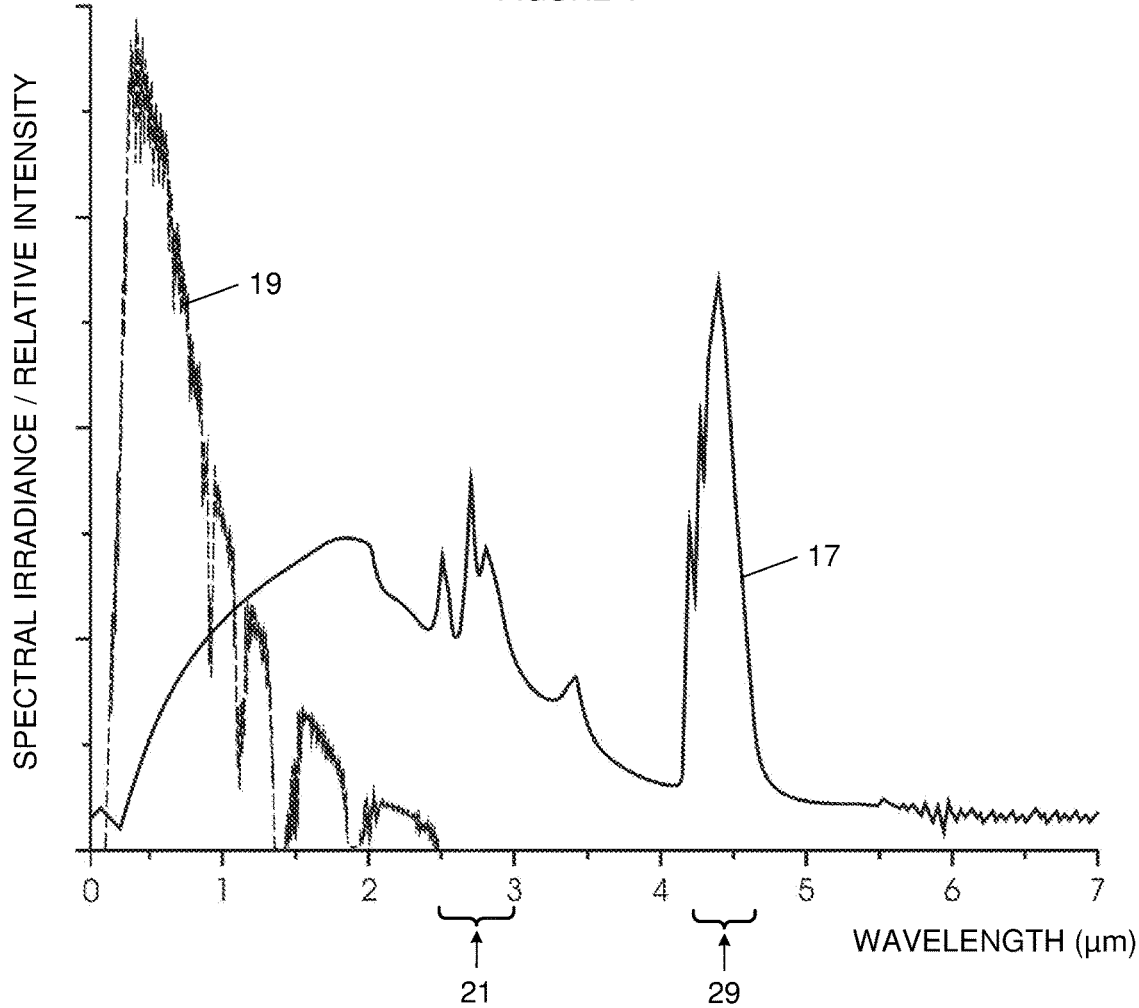
FIG. 5 is a graph illustrating an example of spectral irradiance emitted by a flame for various wavelengths and, superimposed thereon, solar irradiance that may typically be present at sea level for various wavelengths.

The first radiation detector (12) comprises one or more thermocouples or a set of thermocouples arranged in a thermopile configured to detect radiation (13) emitted by the flame (14). FIG. 5 shows a first graph (17) illustrating radiation typically emitted by a fire and a superimposed second graph (19) shown in broken lines, and illustrating an example of solar radiation for various wavelengths. The vertical axis in FIG. 5 indicates relative intensity and/or spectral irradiance (often measured in $W.m^{-2}.nm^{-1}$), but the graphs (17, 19) are not to scale and are provided for illustrative purposes. The first radiation detector (12) is in this embodiment a first wideband radiation detector having a detection range in a wide wavelength band having a width that may be at least 1 μm to 7.5 μm. A first passband filter (not shown) is applied to the first wideband radiation detector (12) and limits the width of the detection range of the first wideband radiation detector to a first narrow wavelength band, thereby enabling the first wideband radiation detector to detect radiation emitted by the flame (14) in the first narrow wavelength band.

The first narrow wavelength band is for example between 2.5 μm and 3.2 μm so that radiation (13) of the flame (14) at a wavelength of 2.7 μm or 2.8 μm or 2.9 μm or 3 μm may be detected. Alternatively the first narrow wavelength band may be between 4 μm to 5 μm, so that flame radiation at a wavelength of 4.1 μm or 4.2 μm or 4.3 μm or 4.4 μm or 4.5 μm may be detected by the first radiation detector (12). Referring again to FIG. 5, the first passband filter is provided to enable the first radiation detector (12) to be resistant, or impervious to detecting solar radiation (19) (often referred to as "solar blind"), while also being able to detect radiation (13) emitted by the flame (14). In the example embodiment, the first passband filter is arranged to enable radiation (13) having a wavelength of either 2.8 μm, or 4.3 μm to be detected by the first radiation detector (12), however other wavelengths may be selected as required. The first radiation detector (12) is furthermore resistant or impervious to detecting radiation emitted by a human or mammal body (humans typically emit radiation in the region of 7-14 μm and particularly at 8 μm or 9.5 μm).

A transparent or translucent optic is provided for the first radiation detector (12). The optic comprises a body or substrate that may be of quartz (not shown) and the body has a layer or a coating or a cladding provided thereon (also not shown). In this embodiment, the first passband filter comprises this layer applied to the body of the optic of the first radiation detector. This layer is configured to filter the radiation (13) to enable a narrower wavelength band (21) including radiation (13) emitted by the flame (14) to pass the filter layer and to be detected by the first radiation detector.

The narrower wavelength band (21) may for example be between 2.4 μm and 3 μm for the first radiation detector. It will be appreciated that the values referred to in this specification should be interpreted to include industry acceptable variations (including, but not limited to, the values that relate to wavelengths, frequencies, time, distances, spectral irradiance or relative intensities, percentages and angles).

Figure 2:
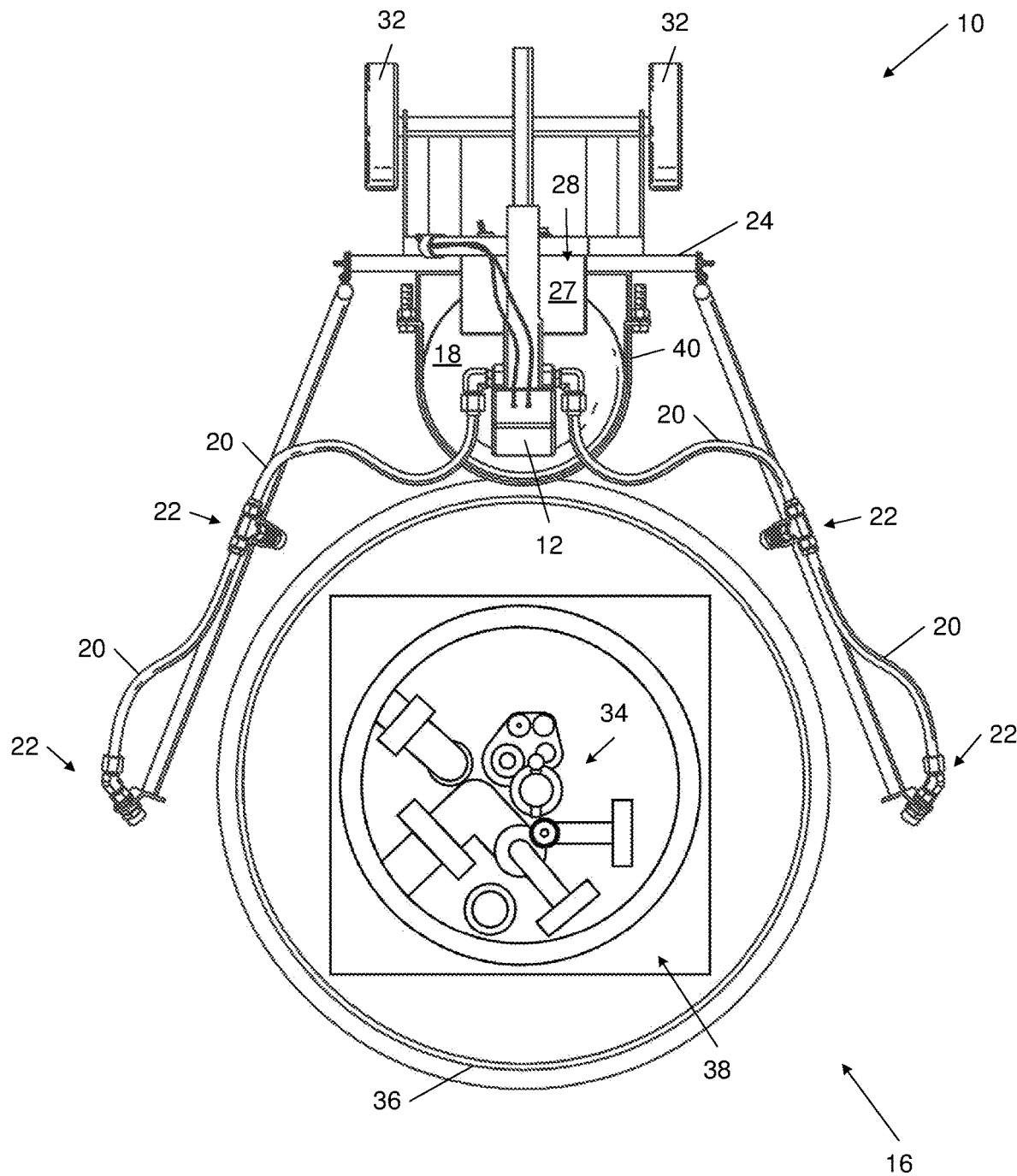
FIG. 2 is a plan view of the system of FIG. 1 provided at a manhole with equipment provided in the manhole.
Figure 3:
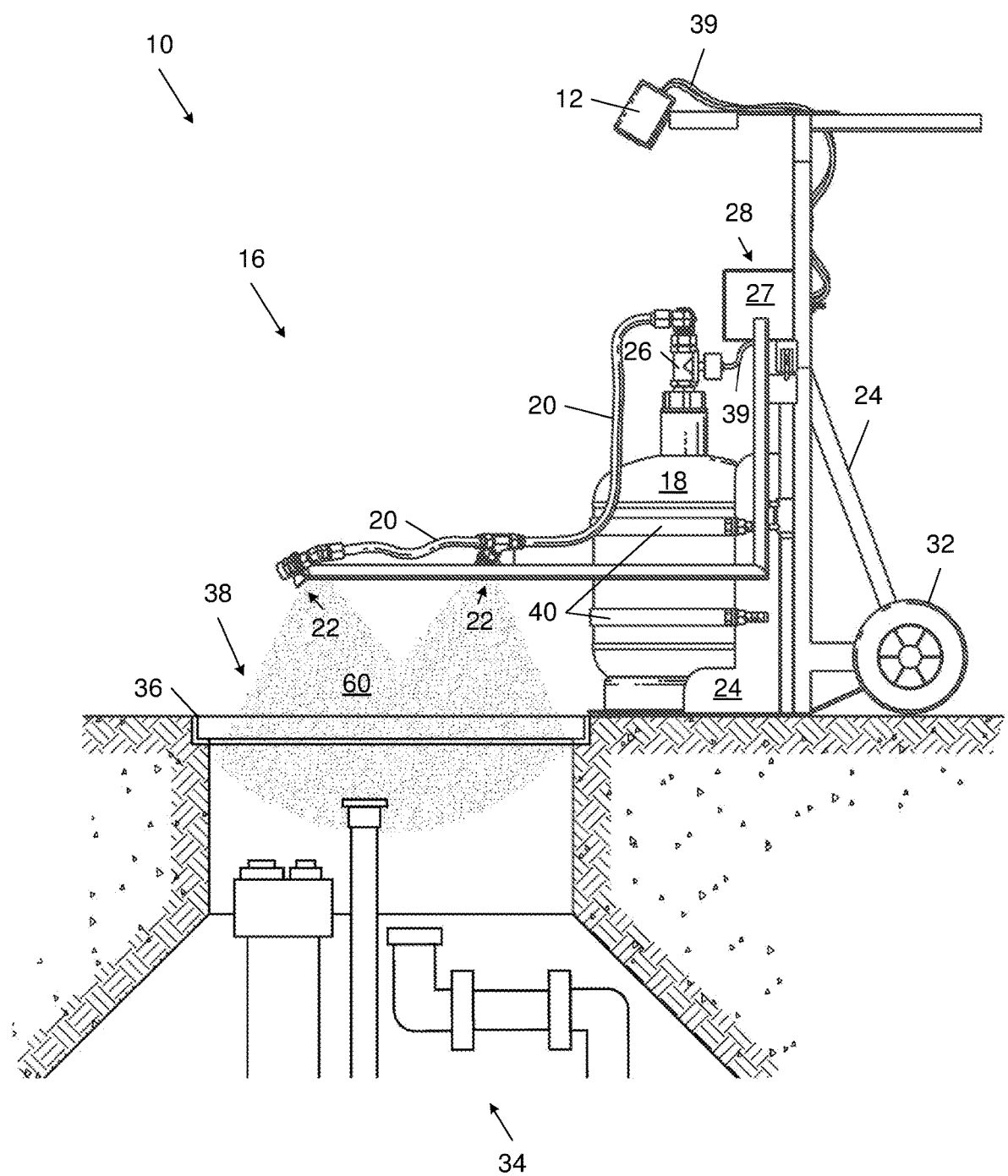
FIG. 3 is a sectional side view, showing the system of FIG. 2.

Referring to FIGS. 2 and 3, in the embodiment of the invention, the system (10) is provided at a fuel station or at a filling station and fuel-related equipment (34) is provided in the monitoring region (16) monitored by the system(10). Hence, the monitoring region (16) is a region at the fuel station where hydrocarbon fuel or other flammable fuel is located, or where vapour, gas or fluid relating to the fuel is expected to be present. The mobile support structure (24) is provided in proximity to a manhole opening (36) or other location at the fuel station. A pit (38) is provided below the manhole (36), and the fuel-related equipment (34) is provided in the pit (38). The fuel-related equipment may be a fuel pump or a fuel inlet for a subterranean fuel tank or reservoir (which may be located below the equipment (34)), to name but a few examples. The one or more nozzles (22) are, in use, directed at the monitoring region (16) and at the fuel-related equipment (34). A distance between the nozzles and the monitoring region (or the distance between the nozzles and the equipment) is in the embodiment shown less than 2 m, or less than 1 m, and a distance between the first radiation detector (12) and the monitoring region (16) may also be less than 2 m, or less than 1 m. Wires (39) may be provided for connecting the controller to the first radiation detector (12) and to the solenoid valve (26).

The container (18) is in this embodiment in the form of a tank for holding the fire suppression agent under pressure and may be removably mountable to the mobile support structure (24) by means of a clamp (40) with fasteners (41). The container may alternatively be otherwise carried by the mobile support structure (24), and may for example be permanently mounted thereto. In the embodiment of the invention shown in FIGS. 1 to 3, the components of the system (10) are also mounted to the mobile support structure (24).

Figure 4:
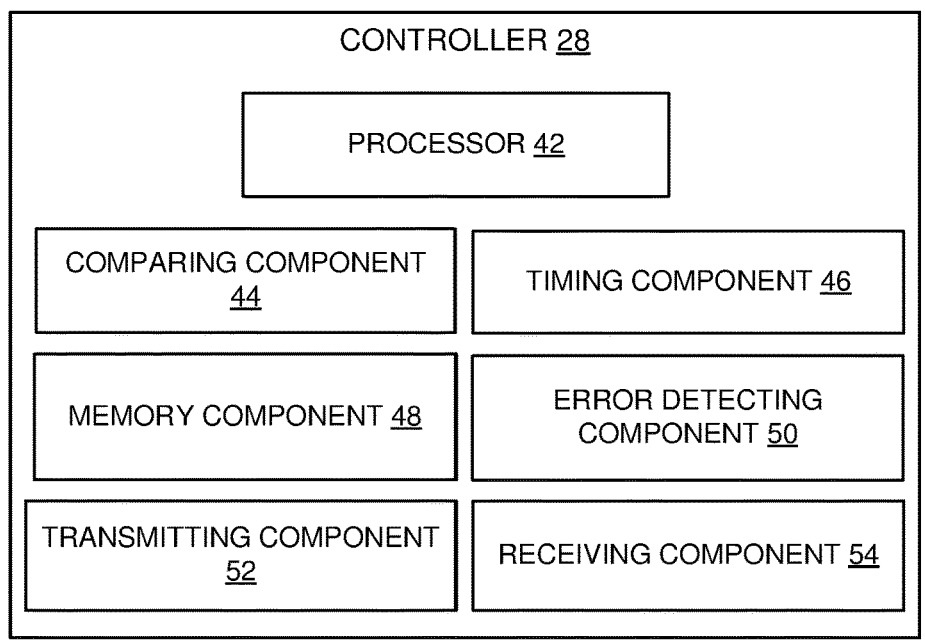
FIG. 4 is a block diagram of a controller forming part of the mobile fire protection system.

A block diagram of the controller (28) is shown in FIG. 4. The controller (28) comprises a processor (42), a comparing component (44), a timing component (46), a memory component (48) an error detecting component (50), a transmitting component (52) and a receiving component (54). The components of the controller (28) and their functionalities are discussed in further detail below. The system (10) may be configured so that a time between ignition of the flame (14) and an initiation of the fire suppression agent discharge is less than 100 milliseconds (ms), alternatively less than 50 ms, alternatively less than 35 ms, alternatively less than 5 ms. This may be advantageous, especially with regards to hydrocarbon fires or other fires where rapid deployment of the fire suppression agent is required and where human lives are at stake.

Figure 6:
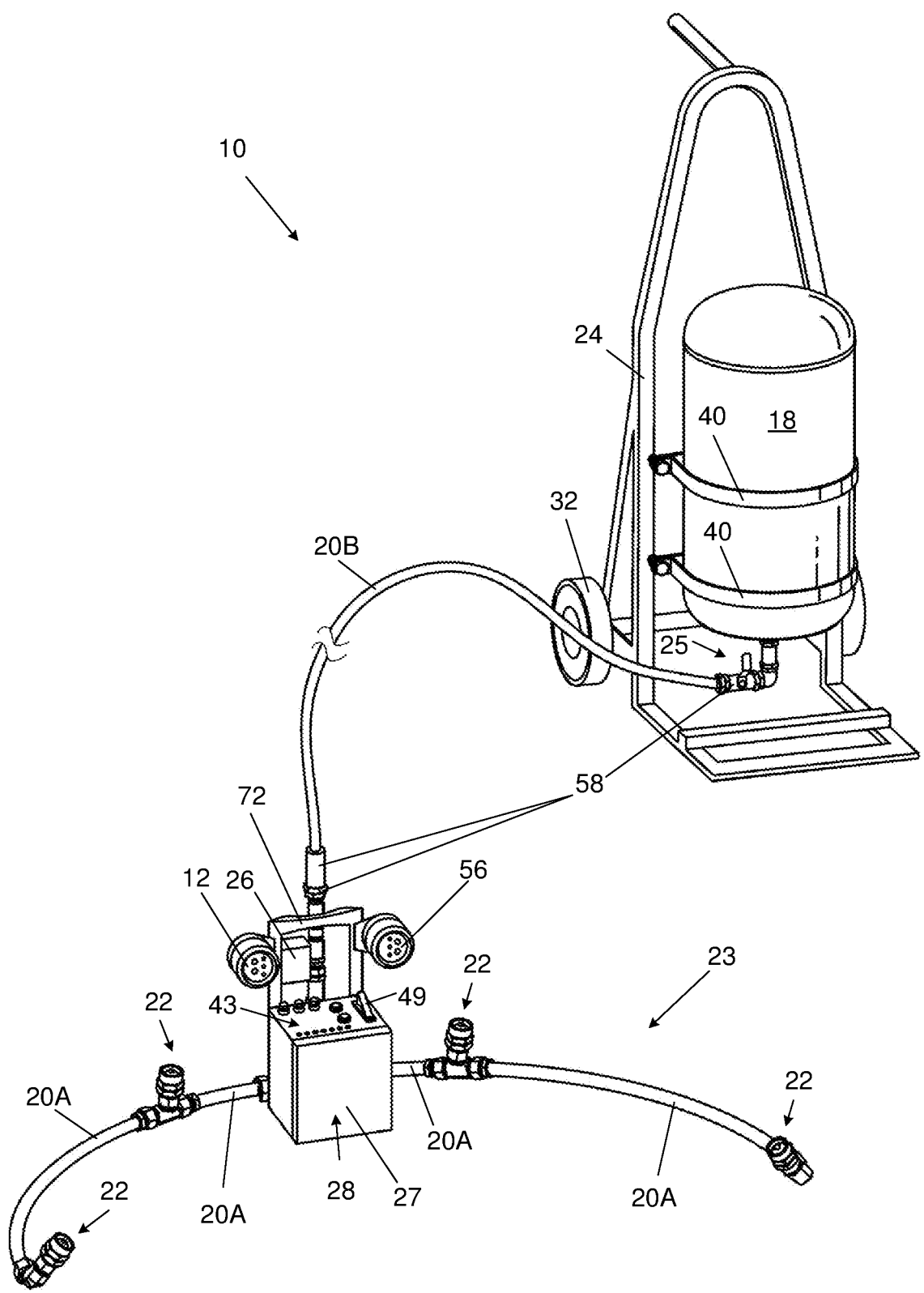
FIG. 6 is a three dimensional view of another embodiment of the mobile fire protection system.
Figure 7:
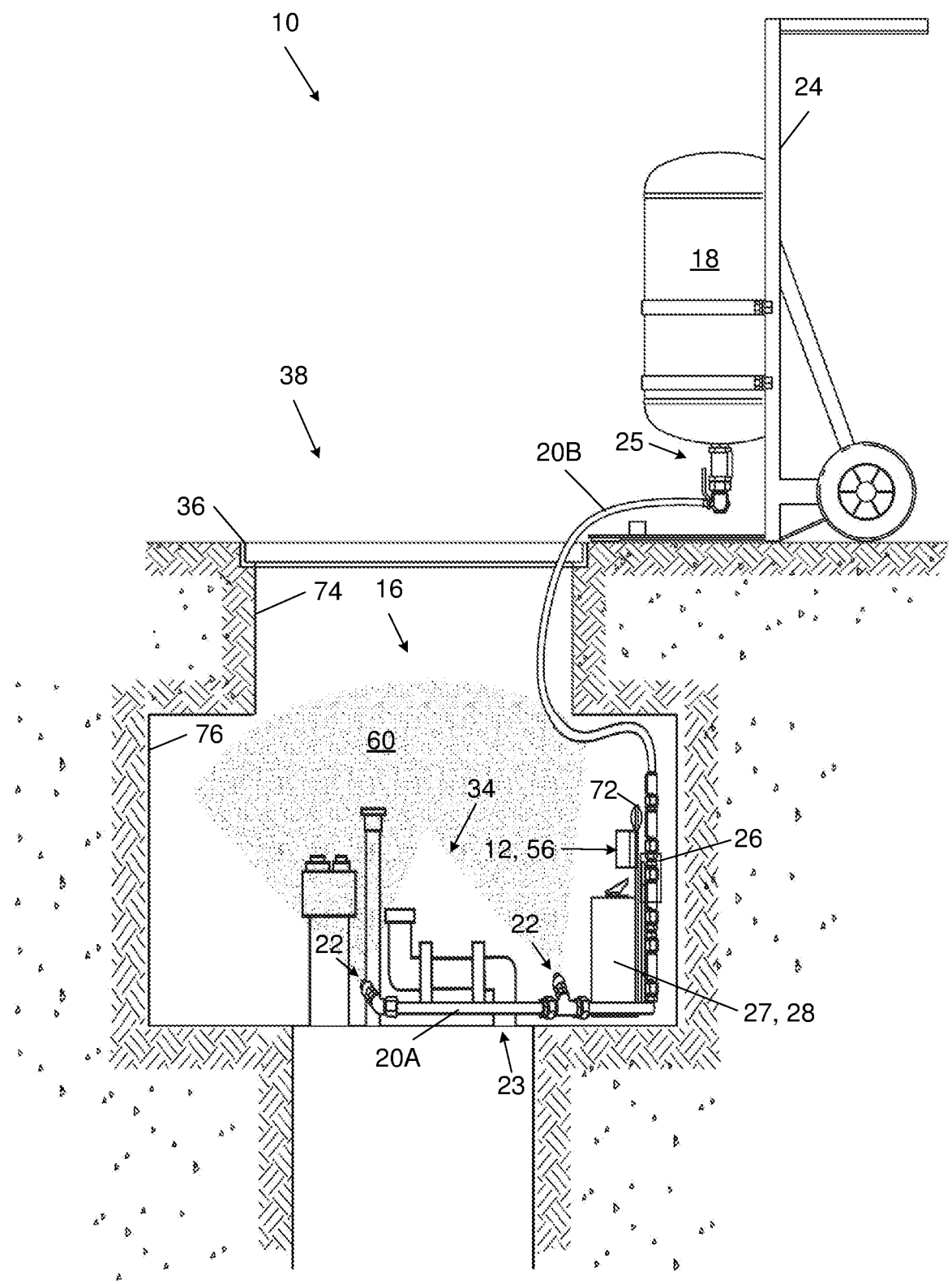
FIG. 7 is a sectional view, showing the system of FIG. 6 provided at a pit, with equipment provided inside the pit and some of the components of the system provided inside the pit.
Figure 8:
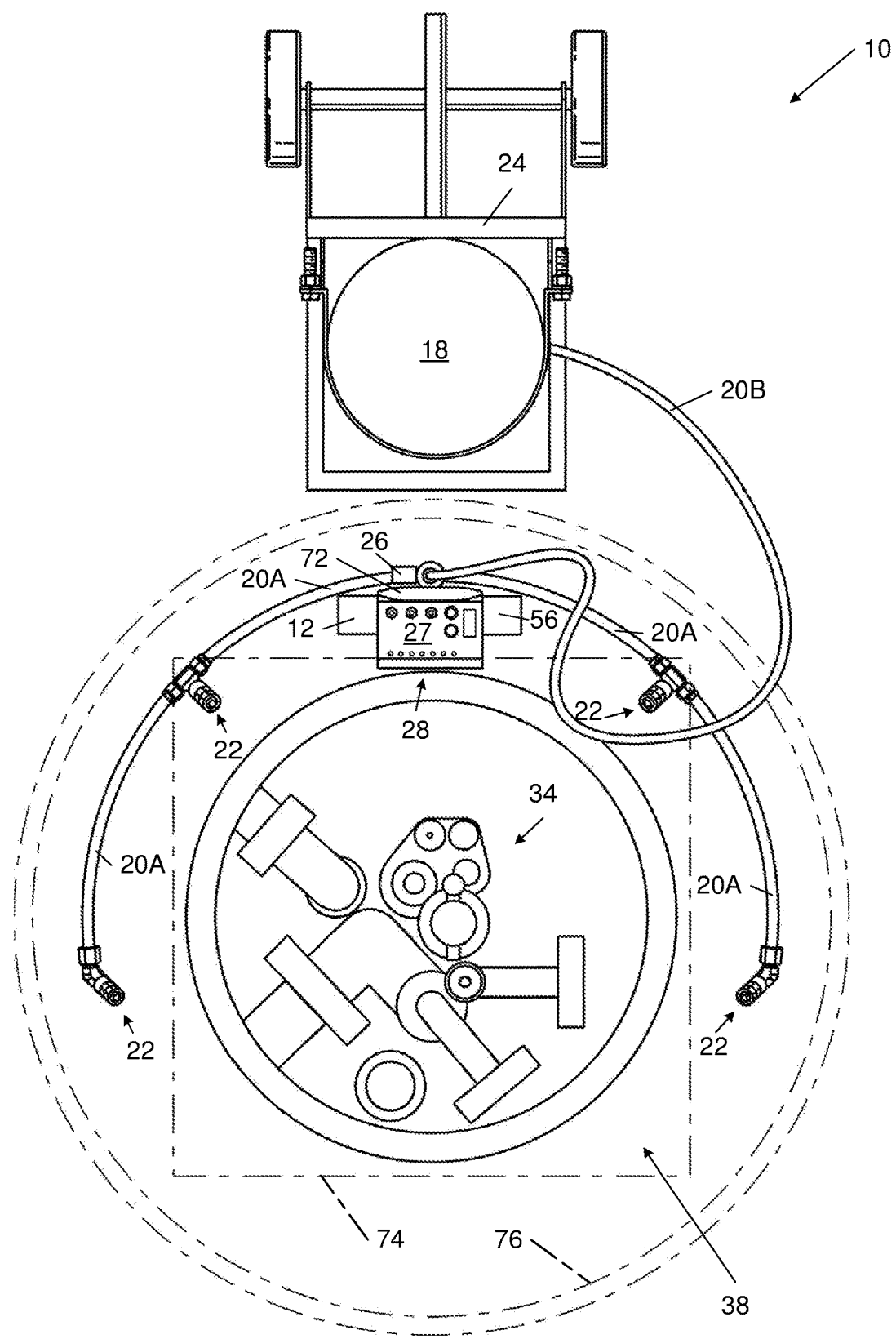
FIG. 8 is a plan view of the system of FIG. 7, with parts of the pit shown in broken lines to reveal the components of the system that are provided inside the pit.
Figure 9:
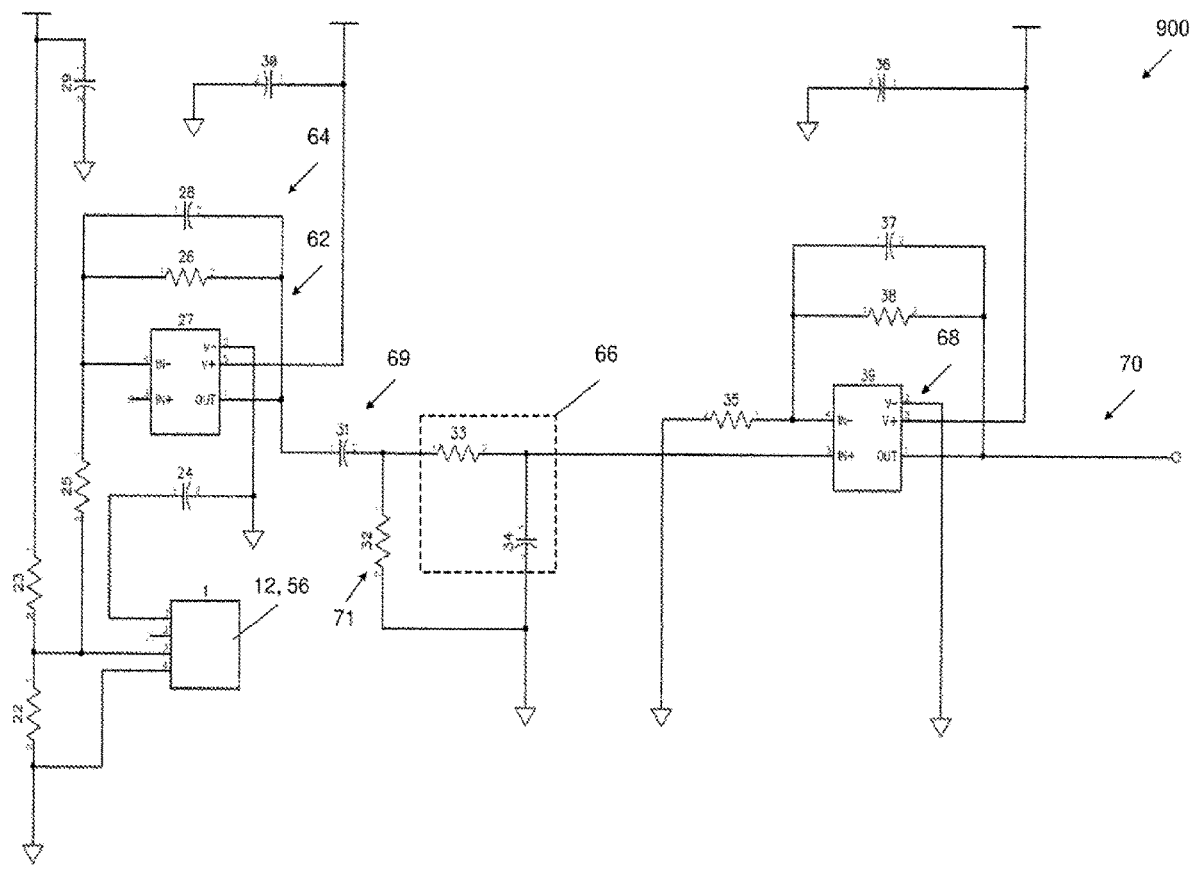
FIG. 9 is a circuit diagram illustrating the radiation detector and other circuitry including operational amplifiers and a low-pass filter forming part of the system.
Figure 10:
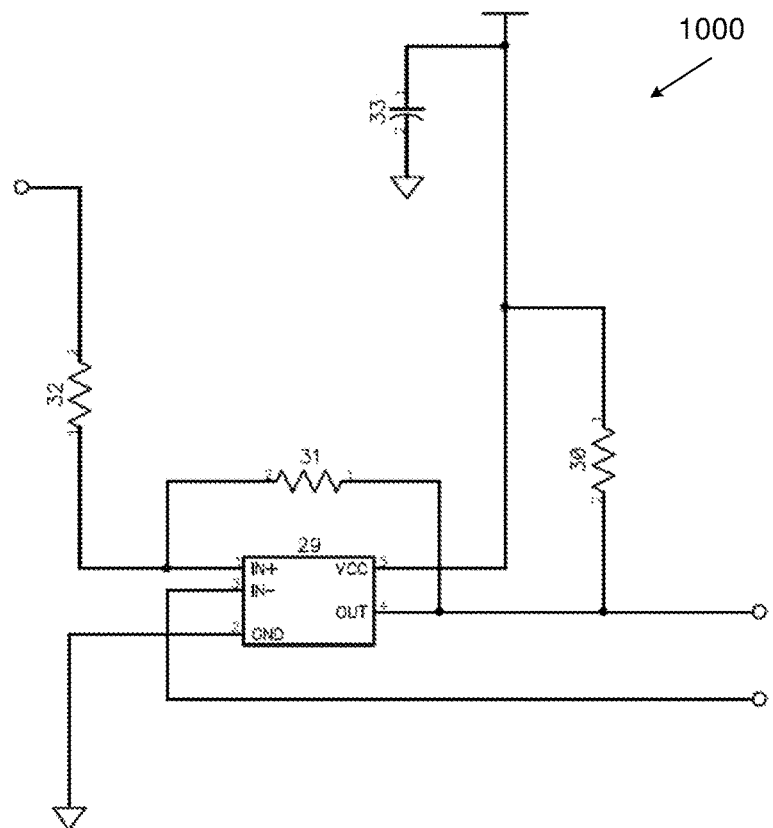
FIG. 10 is a circuit diagram illustrating a threshold comparator utilised by the system.
Figure 11:
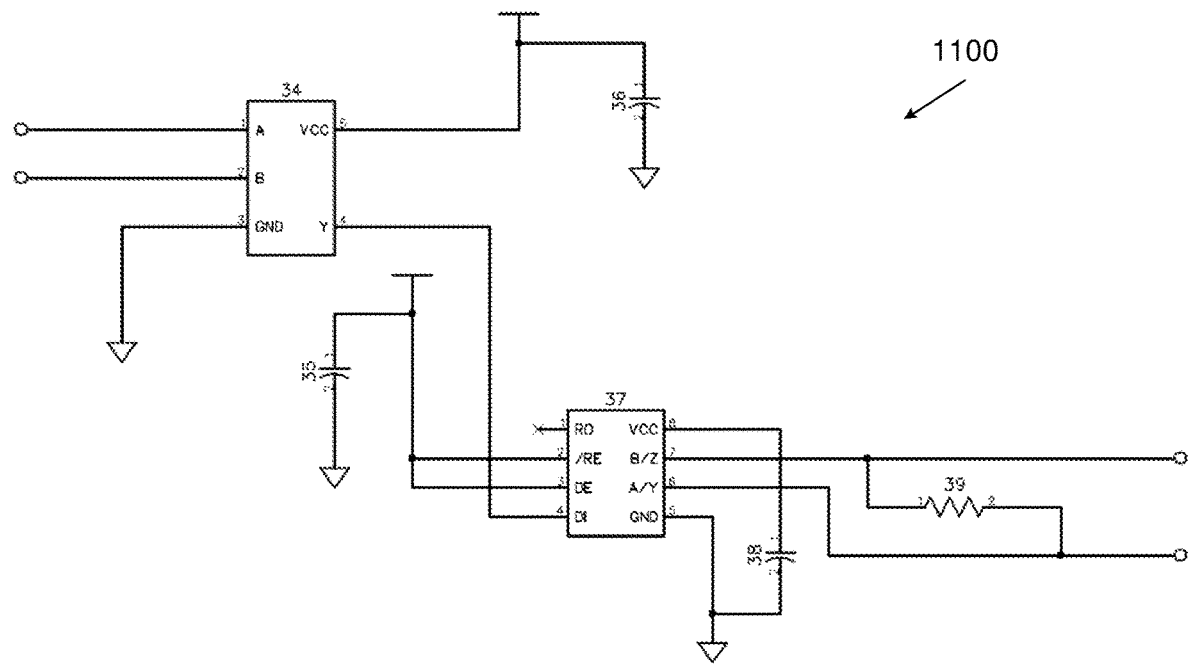
FIG. 11 is a circuit diagram of an RS-485 transceiver that may be used by the system.
Figure 12:
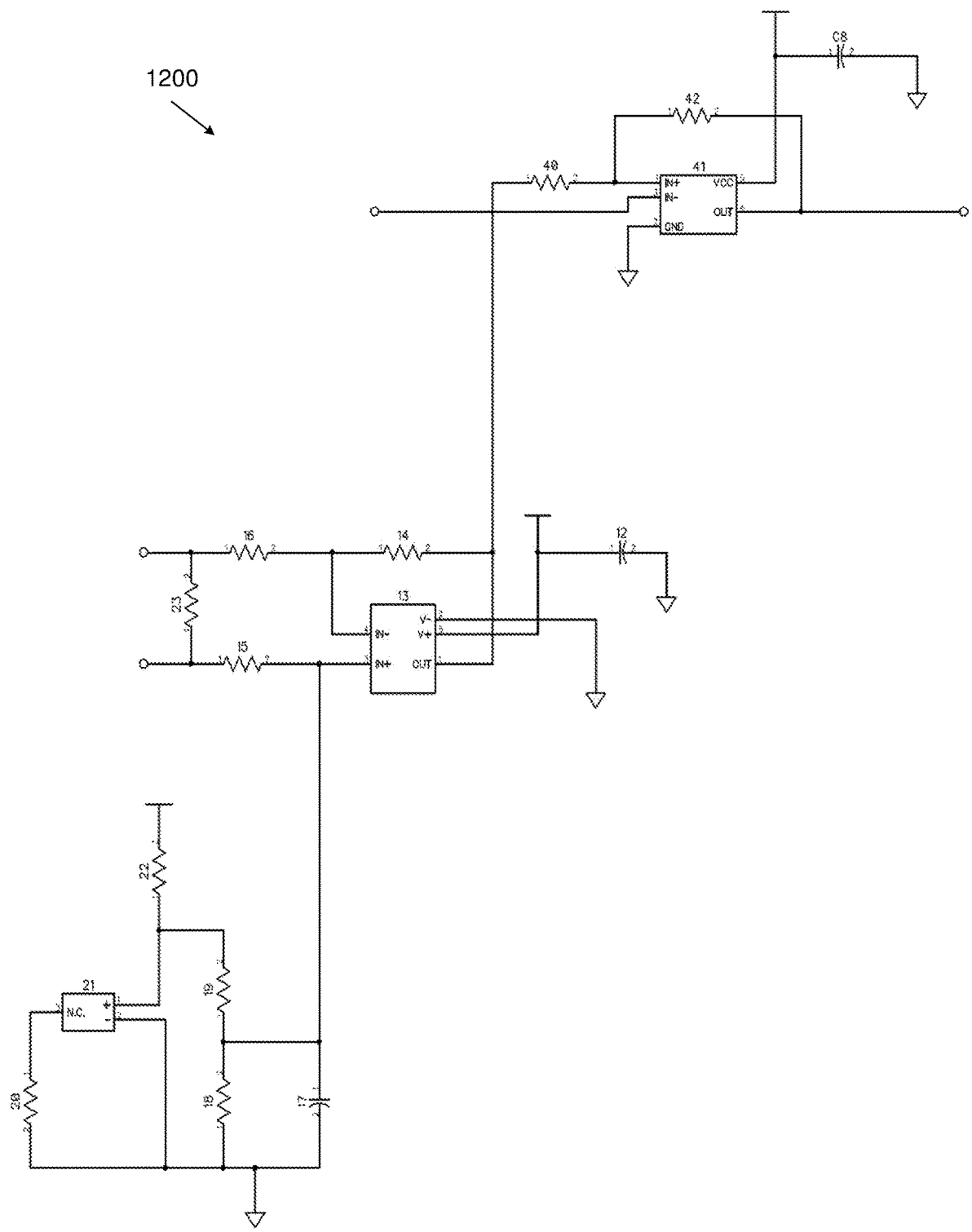
FIG. 12 is a circuit diagram of an analogue 3-state differential transmission circuit which may be utilised by the system.

FIGS. 6 to 8 show another embodiment of the invention. A separate support or frame (72) is provided whereto rigid pipes (20A) (these may alternatively be flexible pipes) with the nozzles (22) are mounted. The separate frame (72) may have any suitable shape (such as I-shaped, square shaped or rectangular, U-shaped etc.) so that some of the components of the system may be mounted thereto. The housing (27) with the controller (28) may be mounted to the separate frame and the solenoid valve (26) may also be provided on the separate frame (72). The housing (27) may accommodate the battery and circuitry relating to the controller (28). The housing (and other components of the system) may be made of a fire-resistant material.

In this embodiment, the system (10) includes the first wideband radiation detector (12) and also a second wideband radiation detector (56) with a second passband filter (not shown) applied to the second wideband radiation detector (56) to enable the second wideband radiation detector to detect radiation emitted by the flame in a second narrow wavelength band that may be different from the first narrow wavelength band detected by the first wideband radiation detector (12) (by virtue of the first passband filter applied thereto). The second wideband radiation detector (56) may be similar to the first wideband radiation detector (12) and the second passband filter may be different from the first passband filter in that it allows the second narrow wavelength band to pass. A transparent or translucent optic may be provided for the second radiation detector (56) in a similar fashion as described above with reference to the first radiation detector (12). Hence, the first and/or second passband filter may comprise the layer, coating or cladding applied to the body of the optic of the first and/or second radiation detector, the layer being configured to filter the incoming radiation to enable a narrower wavelength band including radiation emitted by the flame to pass the filter layer and to be detected by the first and/or second radiation detector.

For the sake of clarity, the flame (14) is not shown in the figures apart from FIG. 1, however it will be appreciated that a similar flame or other ignition may be detected by embodiments of the invention described herein. The second narrow wavelength band is for example between 2.5 μm and 3.2 μm so that radiation (13) of the flame (14) at a wavelength of 2.6 μm, 2.7 μm or 2.8 μm or 2.9 μm or 3 μm may be detected by the second radiation detector (56). Alternatively the second narrow wavelength band may be between 4 μm to 5 μm, so that flame radiation at a wavelength of 4.1 μm or 4.2 μm or 4.3 μm or 4.4 μm or 4.5 μm may be detected by the second radiation detector (56). In the example embodiment in FIGS. 5-7, the first narrow wavelength band is between 2.7 μm and 2.9 μm for the first radiation detector (or between 2750 nm and 2850 nm, or with a middle of the narrow wavelength band at the 2.8 μm wavelength with 50 nm to 120 nm of variance allowed to either side). The second narrow wavelength band is in the example embodiment between 4.2 μm and 4.4 μm, or between 4250 nm and 4350 nm for the second radiation detector (56). Similarly a middle of the second narrow wavelength band may be at the 4.3 μm wavelength with 50 nm to 120 nm of variance to either side. Referring again to FIG. 5, the second passband filter is provided to enable the second radiation detector (56) to detect radiation emitted by the flame (an example of which is illustrated by the first graph (17)), specifically in the second narrow wavelength band (29), for example between 4.2 μm and 4.4 μm. The controller may be configured to cause the valve to open when one of the radiation detectors detects flame radiation with a relative intensity of at least 3000, alternatively at least 6000. The controller may also be configured to cause the valve to close after a predetermined time as provided by timing component (46) for example after 30 seconds. After the expiry of that predetermined period, the radiation detector (s) scans the monitoring region (16) to check whether the fire has been extinguished completely. If not, the process described here is repeated until such time as the fire is extinguished fully.

In the embodiment in FIGS. 7 and 8, the pit (38) may be a deeper pit than the pit in FIGS. 1 to 3, and the fuel-related equipment (34) may be provided deep inside or at the bottom of the pit (38). The deeper pit may comprise an upper square part (74) and a lower round part (76). When maintenance or operation of the equipment is to be performed, a human would typically climb inside the pit (38) through the manhole opening (36), through the upper square part (74) and crouch or stand inside the lower round part (76) of the deeper pit (38) to access the equipment (34). This is particularly dangerous because fuel vapours are often present in the monitoring region (16) (which is in this embodiment a region inside the pit (38)), and the present invention may alleviate this danger. In the embodiment shown in FIGS. 7 and 8, the outlet nozzles (22) may be provided inside the pit (38). The separate frame (72) is operatively placed inside the pit (38). The first and the second radiation detectors (12, 56) may also be provided in the pit (38) and mounted to the separate frame (72). Hence, in this embodiment the outlet (22) is provided at a remote location from the mobile support structure (24) and the pipe or passage may be in the form of a flexible pipe (20B) connectable to the container (18) and to the nozzles (22) which are provided in a nozzle array (23) (with rigid pipes (20A)). As is shown in FIG. 6, coupling devices (58) are provided to couple the flexible pipe (20B) to the container (18) and to the nozzle array (23). These coupling devices (58) may be of a quick-release type to provide versatility and ease of use. The valve (26), which is also a solenoid valve in this embodiment, the controller (28), and the housing (27) for the controller (28) (and/or for the battery) may be provided on the separate frame (72) in the pit (38). A further valve, in this embodiment in the form of a manual ball-type valve (25) may be provided between the flexible pipe (20B) and the container (18), so that the pipe may be manually pressurised with the fire suppression agent prior to use of the system (10). The container (18) may also be provided upside down in this embodiment, with the ball-type valve provided operatively below the container (18).

It will be appreciated that the separate frame (72) with some of the components of the system thereon may even be left inside the pit (38) (or otherwise near the equipment (34) or monitoring region (16)), by releasing one or more of the coupling devices (58). The container (18) may then be moved to another location and connected to another separate frame which may have similar components thereon. It is envisaged that this may provide ease of use which may cause the system to be used more regularly and easily than prior art systems that the applicant is aware of, and which may hence provide increased safety and protection against fires. The system may also provide increased protection because the nozzles are placed in close proximity to the monitoring region and/or to the equipment being monitored and/or to the potentially hazardous region, which may cause a potential fire to be controlled and/or suppressed and/or extinguished faster than with prior art systems.

The container (18) or tank holds the fire suppression agent which may be selected from the group of agents comprising: helium, neon, argon, nitrogen, $CO_2$, inergen™ (being a proprietary blend of Ar (50%), N (42%) and $CO_2$ (8%)), Telesolv™ 1% (proprietary foam concentrate), FM 200™ or $CF_3CHFCF_3$ (Heptafluoropropane), HFC 227™ or 1,1,1,2,3,3,3-Heptafluoropropane, HFC125™ or 1,1,1,2,2-pentafluoroethane, or a combination of these. Other fire suppression agents may be used and wetting agent(s) may also be provided to enable the fire suppression agent to be discharged in a mist-like cloud (60) as is depicted in FIGS. 3 and 7. The wetting agent(s) may provide the functionality of increasing the volume occupied by the mist-like cloud (60). The nozzles may be arranged to control the formation of the mist-like cloud (which may also be referred to as an aerosol or an aerosol mass). Dry agents may also be used. The fire suppression agent may be a so-called "clean agent", for example an electrically non-conducting fire suppression agent that does not leave a residue when it evaporates.

Referring again to FIG. 4, the system (10) includes the comparing component (44) which is configured to compare the radiation detected by one of the first and second radiation detectors (12, 56) to a threshold value and responsive thereto, the controller (28) is configured to cause the valve (26) to move to the open state when the radiation detected by the one of the first and second radiation detectors exceeds the threshold value. This may be provided for, in an analogue Boolean (AND/OR/NOT etc.) type arrangement of circuitry (or in some embodiments by means of software and/or firmware) and/or by utilising hysteresis. Alternatively, the comparing component (44) may be configured to compare a value of the radiation detected by the first radiation detector (12) to a value of the radiation detected by the second radiation detector (56) to determine a difference therebetween and to cause the valve (26) to move to the open state when the difference exceeds, or is less than a threshold. Alternatively, the controller (28) may be configured to cause the valve to move to the open state when radiation of a particular wavelength is detected by one of the first and second radiation detector (12, 56).

FIG. 9 shows a circuit diagram (900) illustrating the first radiation detector (12) and other circuitry provided in concert with the controller (28). It will be appreciated that a similar circuit may be provided for the second radiation detector (56). As described above, the first radiation detector (12) may be arranged to detect radiation emitted by the flame (14) at or near the 2.8 μm wavelength, whereas the second radiation detector (56) may be configured to detect radiation emitted by the flame (14) at or near the 4.3 μm wavelength (or vice versa, or other wavelengths as required). The first and/or second radiation detector (12, 56) may be in the form of one or more thermocouples, in this embodiment in the form of a thermopile which comprises an arrangement of thermocouples (or photo-elements) configured to detect radiation (13) emitted by the flame (14). A first stage operational amplifier (62) may be provided and connected to the thermopile (12, 56). A bandwidth limiting filter (64) may be provided as necessary. A low-pass filter (66) is further provided and configured to filter out frequencies of signal(s) received from the detector that are above 20 Hz (but another frequency may be selected as required). This enables the circuit (900) (and the system (10)) to distinguish between a flame which typically comprises a flicker frequency of less than 20 Hz, and other sources of radiation (such as welding, electrical lights etc.) that typically comprise flicker frequencies of higher than 20 Hz. Flames typically flicker at about 11 Hz. This may provide robustness and resistance to erroneous detection of other sources of radiation that is not a flame sought to be suppressed. A second stage operational amplifier (68) may also be provided. Other electric elements such as, but not limited to, capacitor (69) and resistor (71) may be provided, for example to alleviate drift (drift current, frequency drift etc.). The circuit (700) may provide an output signal (70) which may be fed to one or more comparators that are discussed below.

Referring to FIGS. 4 and 9, the controller (28) may be configured to determine whether a frequency of the detected radiation is greater than a predetermined value, such as 50 Hz, alternatively 30 Hz, alternatively 20 Hz alternatively 10 Hz. The controller may further be configured to be responsive only to detected radiation having a frequency or flicker frequency of less than the predetermined value, for example less than 20 Hz (for example as described above with reference to FIG. 9). In other words, the controller may be configured to detect a flicker pattern of the flame which enables it to distinguish between a real flame and another source of radiation such as an electrically powered light. It is envisaged that it may be possible to provide some of the features described herein by means of hardware, or by means of software executed by the processor (42). Some of the features that may be provided by software are: performing pattern recognition or other forms of machine learning; or using artificial intelligence technologies to for example determine the flicker pattern of the flame. The low-pass filter (66) is hence provided to enable the controller (28) not to be responsive to detected radiation having a frequency of more than the predetermined value.

Referring to FIG. 10, a circuit diagram (1000) is shown illustrating a threshold comparator. A threshold comparator may be provided for each of the first and second radiation detectors (12, 56). The two threshold comparators may then be provided in a Boolean OR type configuration. The output signal from the circuit in FIG. 9 may be provided to one of the threshold comparators.

FIG. 11 shows a circuit diagram (1100) illustrating an RS-485 type transceiver which may be utilised to facilitate comparison of outputs of the threshold comparators.

FIG. 12 shows an analogue 3-state differential transmission circuit (1200) which, in conjunction with the circuits depicted in FIGS. 10 and 11, may provide the functionality of enabling three states to be observed by the controller (28). A first state, wherein if an output signal of a first one of the threshold comparators is greater than the other, a "fire detected" signal is generated, a second state, wherein if the output signal of the first one of the threshold comparators is equal to the other, a "fault" signal is generated which may be indicative of one or more of the components of the system (10) being faulty, and a third state, wherein if the output signal of the first one of the threshold comparators is less than the other, a "no fire" signal is generated. These three states and their respective signals (and the meaning of each signal as interpreted by the controller) may of course be changed or chosen as required by the particular application.

As shown in FIG. 6, a plurality of light-emitting diodes (LED's) (43) may be provided in concert with the controller (28). These LED's (or other form of user interface) may provide the functionality of alerting a user of the system whether various components of the system are functional or faulty (for example a Green LED for functional and a Red LED for faulty). These LED's may operatively be provided on the housing (27) of the controller (28) and may indicate the status of the following components of the system (10): (i) first radiation detector; (ii) second radiation detector; (iii) solenoid valve; (iv) battery; (v) electronic circuitry. For example, a worker that is to perform maintenance on the equipment (34) inside the pit (38) would then check that all five green LED's are on, before continuing the maintenance. The pipes (20, 20A, 20B) would be connected, the valve (25) opened, the controller switched on and then, if all the LED's are green, the maintenance would for example be performed in the monitoring region (16) while the system (10) monitors for the presence of a flame. Once a flame is detected, and confirmed to in fact be a flame or at least have a high probability of being a flame, the fire suppressing agent is discharged. This may be performed by the controller (28) transmitting a control signal to the solenoid valve (26). A pressure sensor (and corresponding LED(s) for the pressure sensor) may also be provided to ensure that the hose or pipe is connected, that the ball valve (25) is opened and that the system (10) is ready to monitor. A display may also be provided for the controller to perform the functionality of the LED's. The circuits depicted in the drawings and other circuitry forming part of the system (10) may be configured to provide resistance to electromagnetic interference (EMI) or to provide robustness against EMI. The solenoid valve may also be activated manually, for example by manually activating a switch when a flame is visually detected by an operator of the system. As shown in FIG. 6, an emergency switch (49) (such as a toggle-switch or the like) may also be provided to manually activate discharge of the fire suppression agent in an emergency.

It will be appreciated that the system may be configured to detect a hydrocarbon flame, but the system may also be configured to detect a flame or other ignition of metals, hydrogen, electrical fires (with some modifications to the filters and/or circuits), dust fires (such as coal dust, flour dust or other aerosols, etc.). The monitoring region is close to equipment in the manhole in the drawings, but the system could also be used in other applications for monitoring any region with a potential fire hazard. The first and second radiation detectors with the first and second passband filters do not necessarily need to be configured to detect radiation at or near the 2.8 μm or 4.3 μm wavelengths. Other wavelengths may be used. Third, fourth and fifth or any number of radiation detectors and filters may be provided for monitoring a variety of wavelength bands or specific wavelengths of radiation, including the ultraviolet, visible, wideband infrared, near infrared and other spectral bands. For example, radiation at the 0.8 μm wavelength or at 850 nm may be monitored by the system. The distance between the nozzles and the monitored equipment may be less than 10 m, less than 5 m, less than 2 m or less than 1 m. The controller and/or its housing and the battery (or other power source) may be remotely provided. The battery may be rechargeable. It is envisaged that embodiments are possible that utilise a photodiode instead of a thermopile.

Even though the embodiment shown in FIGS. 1 to 3 only comprises the first radiation detector, the second radiation detector or a plurality of radiation detectors may be provided in this embodiment. It is further envisaged that embodiments are possible with a combination of features from the embodiments described herein. The separate frame may be in another form or another support may also be provided. The wires are not shown in the embodiment of FIGS. 6 to 8, but may be provided to connect controller to solenoid valve and to the radiation detectors. Embodiments that utilise wireless communication between components of the system may also be possible. The $\alpha_{max}$ shown for the embodiment in FIGS. 1 to 3 may also be applicable for embodiment in FIGS. 6-8 which may also have a specified $\alpha_{max}$ that may be similar to the $\alpha_{max}$ of FIGS. 1 to 3. The $\alpha_{max}$ may comprise the maximum effective field of view of the respective radiation detector, in which field a flame can be detected with an acceptable amount of reliability. It will be appreciated that the field of view extends in both a horizontal and vertical plane. It will also be appreciated that, by providing a plurality of radiation detectors, the cumulative field of view of the plurality of detectors, enlarges the effective field of view beyond the $\alpha_{max}$ observed by any one of the radiation detectors. These fields of view of the respective ones of the plurality of radiation detectors may overlap to form the cumulative field of view.

It will further be appreciated that the system may be manufactured at a relatively low expense when compared to prior art systems that the applicant is aware of. The radiation detectors may be provided in close proximity to the monitoring region (for example less than 5 m or even less than 2 m or less than 1 m), which may increase the accuracy of flame detection and which may increase the overall reliability of the system. It will also be appreciated that the mobile support structure is depicted in FIGS. 1 to 3 as having a pair of arms, extending radially therefrom with the nozzles arranged along the length of each arm. In other envisaged embodiments of the invention, more than two arms (or only one arm) may be present and/or different arrangements of nozzles are envisaged, in order to optimise fire detection and/or fire suppression in a given environment. An advantage of the present invention may be the flexibility that it provides in adapting to different environments. It will also be appreciated that the mobile support structure and/or the separate support enables the system to be moved and positioned in a variety of locations, so that the monitoring region and the outlet are provided at a region where a fire is expected or likely to occur. The embodiment of the invention depicted in FIGS. 6 to 8 also comprises a pair of arms with the nozzles provided along the length of each arm in an array, but embodiments that have only one arm, or even only one nozzle are also possible. The first and second radiation detectors may be carried by the mobile support structure or by the separate support.

Figure 13:
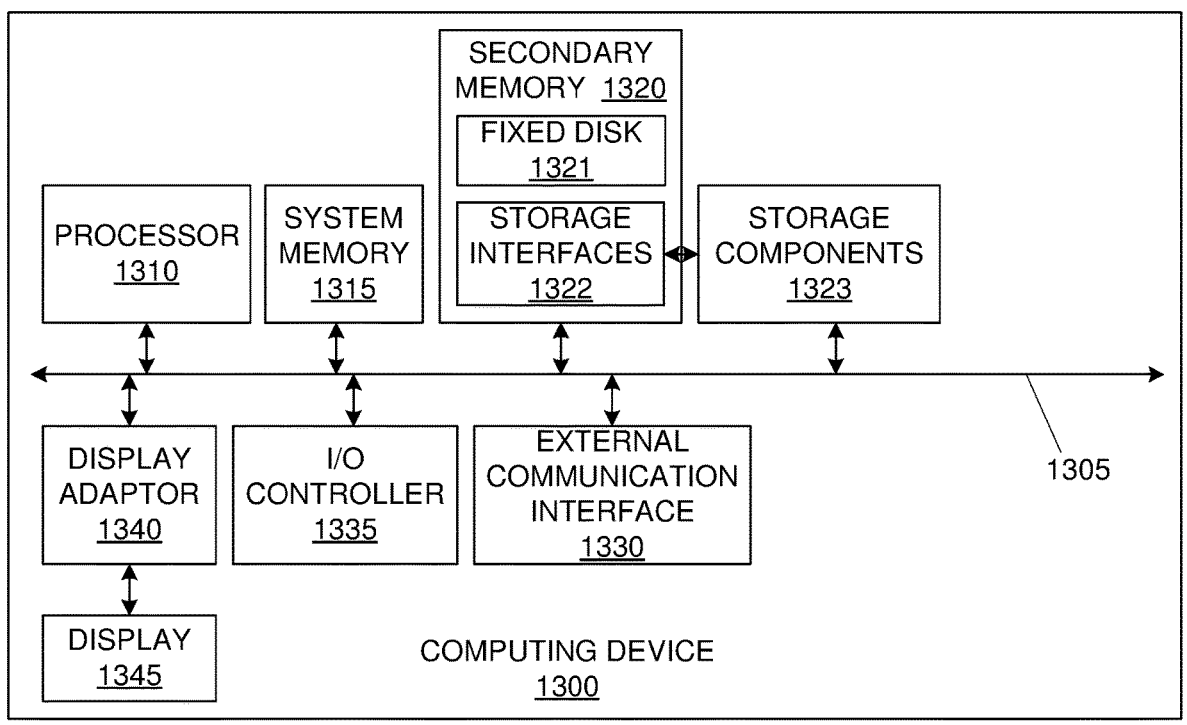
FIG. 13 illustrates an example of a computing device in which various aspects of the disclosure may be implemented.

FIG. 13 illustrates an example of a computing device (1300) in which various aspects of the disclosure may be implemented. The computing device (1300) may be embodied as any form of data processing device including a personal computing device (e.g. laptop or desktop computer), a server computer (which may be self-contained, physically distributed over a number of locations), a client computer, or a communication device, such as a mobile phone (e.g. cellular telephone), satellite phone, tablet computer, personal digital assistant or the like.

Different embodiments of the computing device may dictate the inclusion or exclusion of various components or subsystems described below.

The computing device (1300) may be suitable for storing and executing computer program code. The various participants and elements in the previously described system diagrams may use any suitable number of subsystems or components of the computing device (1300) to facilitate the functions described herein. The computing device (1300) may include subsystems or components interconnected via a communication infrastructure (1305) (for example, a communications bus, a network, etc.). The computing device (1300) may include one or more processors (1310) and at least one memory component in the form of computer-readable media. The one or more processors (1310) may include one or more of: CPUs, graphical processing units (GPUs), microprocessors, field programmable gate arrays (FPGAs), application specific integrated circuits (ASICs) and the like. In some configurations, a number of processors may be provided and may be arranged to carry out calculations simultaneously. In some implementations various subsystems or components of the computing device (1300) may be distributed over a number of physical locations (e.g. in a distributed, cluster or cloud-based computing configuration) and appropriate software units may be arranged to manage and/or process data on behalf of remote devices.

The memory components may include system memory (1315), which may include read only memory (ROM) and random access memory (RAM). A basic input/output system (BIOS) may be stored in ROM. System software may be stored in the system memory (1315) including operating system software. The memory components may also include secondary memory (1320). The secondary memory (1320) may include a fixed disk (1321), such as a hard disk drive (or solid-state drive), and, optionally, one or more storage interfaces (1322) for interfacing with storage components (1323), such as removable storage components (e.g. magnetic tape, optical disk, flash memory drive, external hard drive, removable memory chip, etc.), network attached storage components (e.g. NAS drives), remote storage components (e.g. cloud-based storage) or the like.

The computing device (1300) may include an external communications interface (1330) for operation of the computing device (1300) in a networked environment enabling transfer of data between multiple computing devices (1300) and/or the Internet. Data transferred via the external communications interface (1330) may be in the form of signals, which may be electronic, electromagnetic, optical, radio, or other types of signal. The external communications interface (1330) may enable communication of data between the computing device (1300) and other computing devices including servers and external storage facilities. Web services may be accessible by and/or from the computing device (1300) via the communications interface (1330).

The external communications interface (1330) may be configured for connection to wireless communication channels (e.g., a cellular telephone network, wireless local area network (e.g. using Wi-Fi™), satellite-phone network, Satellite Internet Network, etc.) and may include an associated wireless transfer element, such as an antenna and associated circuitry.

The computer-readable media in the form of the various memory components may provide storage of computer-executable instructions, data structures, program modules, software units and other data. A computer program product may be provided by a computer-readable medium having stored computer-readable program code executable by the central processor (1310). A computer program product may be provided by a non-transient computer-readable medium, or may be provided via a signal or other transient means via the communications interface (1330).

Interconnection via the communication infrastructure (1305) allows the one or more processors (1310) to communicate with each subsystem or component and to control the execution of instructions from the memory components, as well as the exchange of information between subsystems or components. Peripherals (such as printers, scanners, cameras, or the like) and input/output (I/O) devices (such as a mouse, touchpad, keyboard, microphone, touch-sensitive display, input buttons, speakers and the like) may couple to or be integrally formed with the computing device (1300) either directly or via an I/O controller (1335). One or more displays (1345) (which may be touch-sensitive displays) may be coupled to or integrally formed with the computing device (1300) via a display (1345) or video adapter (1340).

The foregoing description has been presented for the purpose of illustration; it is not intended to be exhaustive or to limit the invention to the precise forms disclosed. Persons skilled in the relevant art can appreciate that many modifications and variations are possible in light of the above disclosure.

Any of the steps, operations, components or processes described herein may be performed or implemented with one or more hardware or software units, alone or in combination with other devices. In one embodiment, a software unit is implemented with a computer program product comprising a non-transient computer-readable medium containing computer program code, which can be executed by a processor for performing any or all of the steps, operations, or processes described. Software units or functions described in this application may be implemented as computer program code using any suitable computer language such as, for example, Java™, C++, or Perl™ using, for example, conventional or object-oriented techniques. The computer program code may be stored as a series of instructions, or commands on a non-transitory computer-readable medium, such as a random access memory (RAM), a read-only memory (ROM), a magnetic medium such as a hard-drive, or an optical medium such as a CD-ROM. Any such computer-readable medium may also reside on or within a single computational apparatus, and may be present on or within different computational apparatuses within a system or network.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

Finally, throughout the specification and claims unless the contents requires otherwise the word 'comprise' or variations such as 'comprises' or 'comprising' will be understood to imply the inclusion of a stated integer or group of integers but not the exclusion of any other integer or group of integers.

The invention claimed is:

1. A mobile fire protection system comprising:
   a first radiation detector for detecting radiation emitted by a flame in a monitoring region;
   a container for holding fire suppression agent, the container being in selective fluid flow communication via a passage with an outlet for discharging the fire suppression agent;
   a mobile support structure for carrying the container;
   a separate support whereto the outlet is mounted, the separate support being independently moveable in relation to the mobile support structure, the passage being releasably attachable to the outlet on the separate support, wherein the outlet and the separate support are provided at a remote location from the mobile support structure, and wherein the outlet is provided by a curved nozzle array shaped to extend near a periphery of the monitoring region so as to operatively accommodate a human inside the monitoring region, the nozzle array having one or more nozzles directed inwardly at the monitoring region;
   a valve that is selectively movable between a closed state, wherein the fire suppression agent remains captive within the container, and an open state, wherein flow of the fire suppression agent from the container towards the outlet is enabled; and
   a controller which is configured, responsive to the first radiation detector detecting radiation emitted by the flame in the monitoring region, to cause the valve to automatically move to the open state to discharge the fire suppression agent via the passage and the outlet towards the flame, wherein the controller, the first radiation detector and the valve are configured so that a time between an ignition of the flame and the fire suppression agent discharge initiation by the system is less than 100 milliseconds.

2. The mobile fire protection system as claimed in claim 1, wherein the first radiation detector is a first wideband radiation detector having a detection range in a wide wavelength band having a width of at least 2 µm to 3 µm, alternatively a width of at least 3 µm to 5 µm, alternatively a width of at least 1 µm to 7.5 µm.

3. The mobile fire protection system as claimed in claim 2, wherein a first passband filter is applied to the first wideband radiation detector to limit the width of the detection range of the first wideband radiation detector to a first narrow wavelength band, thereby enabling the first wideband radiation detector to detect radiation emitted by the flame in the first narrow wavelength band.

4. The mobile fire protection system as claimed in claim 3, wherein the first narrow wavelength band is between 2.5 µm and 3.2 µm so that flame radiation at a wavelength of 2.7 µm or 2.8 µm or 2.9 µm or 3 µm is detected by the first radiation detector, alternatively wherein the first narrow wavelength band is between 4 µm to 5 µm, so that flame radiation at a wavelength of 4.1 µm or 4.2 µm or 4.3 µm or 4.4 µm or 4.5 µm is detected.

5. The mobile fire protection system as claimed in claim 1, wherein the first radiation detector is resistant to detecting solar radiation and/or radiation emitted by a human or mammal body.

6. The mobile fire protection system as claimed in claim 1, wherein the system includes a second radiation detector.

7. The mobile fire protection system as claimed in claim 6, wherein at least one of the first and second radiation detectors are carried by either the mobile support structure or the separate support structure.

8. The mobile fire protection system as claimed in claim 6, wherein the first radiation detector is a first wideband radiation detector and a first passband filter is applied to the first wideband radiation detector to limit the width of the detection range of the first wideband radiation detector to a first narrow wavelength band, thereby enabling the first wideband radiation detector to detect radiation emitted by the flame in the first narrow wavelength band, and wherein the second radiation detector is a second wideband radiation detector and wherein a second passband filter is applied to the second wideband radiation detector to enable the second wideband radiation detector to detect radiation emitted by the flame in a second narrow wavelength band that is different from the first narrow wavelength band detected by the first wideband radiation detector.

9. The mobile fire protection system as claimed in claim 8, wherein the first narrow wavelength band is between 2.6 µm and 3 µm and wherein the second narrow wavelength band is between 3.5 µm and 4.5 µm, so that the first radiation detector is configured to detect radiation emitted by the flame in a wavelength region of 2.8 µm, and the second radiation detector is configured to detect radiation emitted by the flame in a wavelength region of 4.3 µm.

10. The mobile fire protection system as claimed in claim 8, wherein the first and second radiation detectors are each in the form of a thermopile configured to detect radiation emitted by the flame and wherein a transparent or translucent optic is provided for each of the first and second radiation detectors, the optic comprising a body having a layer provided thereon and wherein the first and second passband filter respectively comprises the layer, the layer being configured to filter the detected radiation to enable the narrower wavelength band including radiation emitted by the flame to pass the filter layer and to be detected by the first and second radiation detector respectively.

11. The mobile fire protection system as claimed in claim 6, wherein the system includes a comparing component configured to compare a value of the radiation detected by one of the first and second radiation detectors to a threshold value and to cause the valve to move to the open state when the radiation detected by the one of the first and second radiation detectors exceeds the threshold value.

12. The mobile fire protection system as claimed in claim 1, wherein the controller is configured to determine whether a frequency of the detected radiation is greater than a predetermined value, and only to be responsive to detected radiation having a frequency of less than the predetermined value.

13. The mobile fire protection system as claimed in claim 1, wherein the mobile support structure is in the form of a trolley having one or more wheels.

14. The mobile fire protection system as claimed in claim 1, wherein the system is provided at a fuel station, wherein fuel-related equipment is monitored by the system, and wherein the monitoring region is a region at the fuel station where hydrocarbon fuel or other flammable fuel is located.

15. A method of providing mobile protection against a fire, the method comprising:
   providing a first radiation detector for detecting radiation emitted by a flame in a monitoring region;
   providing a container for holding fire suppression agent and enabling the container to be in selective fluid flow communication via a passage with an outlet for discharging the fire suppression agent;
   providing a mobile support structure for carrying the container;
   providing a separate support whereto the outlet is mounted, the separate support being independently moveable in relation to the mobile support structure, the passage being arranged for releasable attachment to the outlet on the separate support, and providing the outlet and the separate support at a remote location from the mobile support structure;
   providing the outlet by way of a curved nozzle array shaped to extend near a periphery of the monitoring region so as to operatively accommodate a human inside the monitoring region, the nozzle array having one or more nozzles directed inwardly at the monitoring region;
   between the container and the outlet, interposing a valve that is selectively movable between a closed state, wherein the fire suppression agent remains captive within the container, and an open state, wherein flow of the fire suppression agent from the container towards the outlet is enabled; and
   responsive to the first radiation detector detecting radiation emitted by the flame in the monitoring region, causing the valve to automatically move to the open state to discharge the fire suppression agent via the passage and the outlet towards the flame, wherein a time between an ignition of the flame and the fire suppression agent discharge initiation is less than 100 milliseconds.

* * * * *